(12) United States Patent
Konno et al.

(10) Patent No.: US 7,667,348 B2
(45) Date of Patent: Feb. 23, 2010

(54) VEHICLE THEFT PREVENTION DEVICE

(75) Inventors: Takeshi Konno, Saitama (JP); Naotodn Matsudaira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 11/727,791

(22) Filed: Mar. 28, 2007

(65) Prior Publication Data
US 2007/0228829 A1 Oct. 4, 2007

(30) Foreign Application Priority Data
Mar. 31, 2006 (JP) ............................. 2006-098995

(51) Int. Cl.
*B60R 25/00* (2006.01)
(52) U.S. Cl. .................................... 307/10.2
(58) Field of Classification Search ............... 307/10.3, 307/10.5, 10.2; 340/5.61; 180/219; 70/252
See application file for complete search history.

(56) References Cited

U.S. PATENT DOCUMENTS

| | | | |
|---|---|---|---|
| 4,638,880 A * | 1/1987 | Togashi | 180/219 |
| 6,759,828 B2 * | 7/2004 | Konno | 307/9.1 |
| 7,317,262 B2 * | 1/2008 | Nishijima et al. | 307/10.2 |
| 2006/0131959 A1 * | 6/2006 | Nishijima et al. | 307/10.5 |
| 2006/0152348 A1 * | 7/2006 | Ohtaki et al. | 340/426.1 |

FOREIGN PATENT DOCUMENTS

| | | |
|---|---|---|
| DE | 196 06 265 A1 | 8/1997 |
| EP | 0 630 785 A2 | 6/1994 |
| EP | 1 464 545 A2 | 10/2004 |
| JP | 7-93676 A | 4/1995 |
| JP | 3252244 B2 | 11/2001 |
| WO | WO 2005042317 A1 * | 5/2005 |

* cited by examiner

*Primary Examiner*—Albert W Paladini
*Assistant Examiner*—Daniel Cavallari
(74) *Attorney, Agent, or Firm*—Birch, Stewart, Kolasch & Birch, LLP

(57) ABSTRACT

A theft prevention device makes an ECU operable by transmitting a second ID code to the ECU from a keyset when an input code agrees with a first ID code. A device is provided for inputting a second reference code which is collated with a second ID code provided to a receiver unit of an ECU or a keyset. A device is provided which, when the inputted code and a pre-registered second reference code agree with each other, writes the registered second reference code into the receiver unit as the second ID code. The code which is inputted as the second reference code is inputted based on an opening/closing manipulation of a throttle provided to a vehicle and a plurality of times of standing/storing manipulation of a side stand with and one digit of the code being represented by the number of throttle manipulations during two side stand standing/storing manipulations.

12 Claims, 6 Drawing Sheets

VEHICLE THEFT PREVENTION DEVICE

CROSS-REFERENCE TO RELATED APPLICATIONS

The present application claims priority under 35 USC 119 to Japanese Patent Application No. 2006-098995 filed on Mar. 31, 2006 the entire contents of which are hereby incorporated by reference.

BACKGROUND OF THE INVENTION

1. Field of the Invention

The present invention relates to a vehicle theft prevention device, and more particularly to a vehicle theft prevention device which is suitable for preventing another person from taking an action to move a vehicle using an ID code outputting device.

2. Description of Background Art

A vehicle theft prevention device is known which allows for the starting of an engine only when cipher numbers agree with each other. For example, a vehicle theft prevention device described in Japanese Patent 325224 includes a theft prevention unit which outputs an ID code when an inputted cipher number and a prestored memory number agree with each other. In addition, a control unit is provided which starts a control when the ID code and a prestored memory code agree with each other. Here, the theft prevention unit is configured to output a writing code together with the ID code when the use of the theft prevention unit is first started. In addition, the control unit is configured to write when the ID code is first inputted after the manufacture and when the writing code is inputted to the control unit together with the ID code from the theft prevention unit with the inputted ID code being inputted into a non-volatile memory as the memory code.

According to the theft prevention device described in Japanese Patent 325224, the ID code is written when the use of the theft prevention device is first started. Thus, even when one attempts to move the vehicle by exchanging only the theft prevention unit while using the control unit as it is, the exchanged theft prevention unit cannot generate the same ID code equal to the memory code which is first written in the control unit. Thus, one cannot operate the control unit whereby it is possible to obtain a theft prevention effect.

However, by obtaining and using a brand new theft prevention unit, it is possible to rewrite the memory code stored in the existing control unit thus making the ID code and the memory code agree with each other. Thus, even a third party can move the vehicle.

SUMMARY AND OBJECTS OF THE INVENTION

Accordingly, it is an object of an embodiment of the present invention to provide, in a system which is constituted of a theft prevention ID code generation device and a control unit, a vehicle theft prevention device which can effectively prevent a third party from moving a vehicle using an exchanged theft prevention ID code generation device.

According to an embodiment of the present invention for achieving the above-mentioned object is, in a vehicle theft prevention device which includes a portable transmitter which is arranged outside a vehicle for transmitting a first ID code, a receiver unit which receives the first ID code transmitted from the portable transmitter and outputs a second ID code when the first ID code agrees with a preset first reference code, and an engine control unit which starts an engine control when the second ID code is inputted to the engine control unit and the second ID code agrees with a preset second reference code. The vehicle theft prevention device includes a code inputting means (second ID code generator) for registering the second reference code to the engine control unit, and a means which writes (an ID writing device) the registered second reference code into the receiver unit as the second ID code.

Further, according to an embodiment of the present invention the portable transmitter includes a deciphering means (comparator for deciding) which decides the first ID code based on a cipher inputted from the receiver unit, and the receiver unit includes a reference code decision means (another comparator) which decides the first reference code based on the outputted cipher.

Further, according to an embodiment of the present invention a code which is inputted for registering the second reference code to the engine control unit is inputted in response to an open/close manipulation of a throttle provided to the vehicle and a standing/storing manipulation of a side stand provided to the vehicle.

Further, according to an embodiment of the present invention the second reference code is a value intrinsic to each vehicle.

According to an embodiment of the present invention the device is provided which allows an operation of the engine control device by collating the second ID code inputted from the receiver unit with the second reference code in the engine control device, when the engine control device is exchanged with a brand new engine control device, an inputted code can be registered as the second reference code. Even when a third party inputs the erroneous code and the code is registered, the registered code does not agree with the second ID code inputted from the receiver unit. Thus, the third party cannot make the engine control unit operable. Accordingly, only a user who is authorized to know the second reference code, that is, the second ID code can authentically register the second reference code thus eventually preventing the third party from moving the vehicle by exchanging the engine control unit.

Further, in exchanging the receive unit with a brand new receiver unit, when the inputted code is the authorized second reference code, the second reference code can be registered in the receiver unit as the second ID code. Accordingly, when the inputted code differs from the authorized second reference code, the second ID code is not registered in the receiver unit. Thus, even when the transmitter which transmits the first ID code and the receiver unit are exchanged as a set, the second ID code is not outputted thus eventually preventing a third party other than the user which is authorized to know the second reference ID code from moving the vehicle.

According to an embodiment of the present invention the throttle manipulation means or the side stand manipulation is generally provided to the vehicle and is used as an inputting means of an instruction or numerical values for generating the code and the code can be registered. Thus, it is unnecessary to provide a dedicated ten key or a dedicated manipulation switch. Accordingly, it is possible to achieve theft prevention effect without adding parts by newly forming a space for inputting the second reference code.

According to an embodiment of the invention, the second reference code is the value intrinsic to each vehicle. Thus, only the user of the vehicle is authorized to know the second reference code. Accordingly, even when the engine control unit and the receiver unit are newly mounted, a third party cannot start the engine unless the third party accurately input the second reference code. Thus, it is possible to achieve a remarkable theft prevention effect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
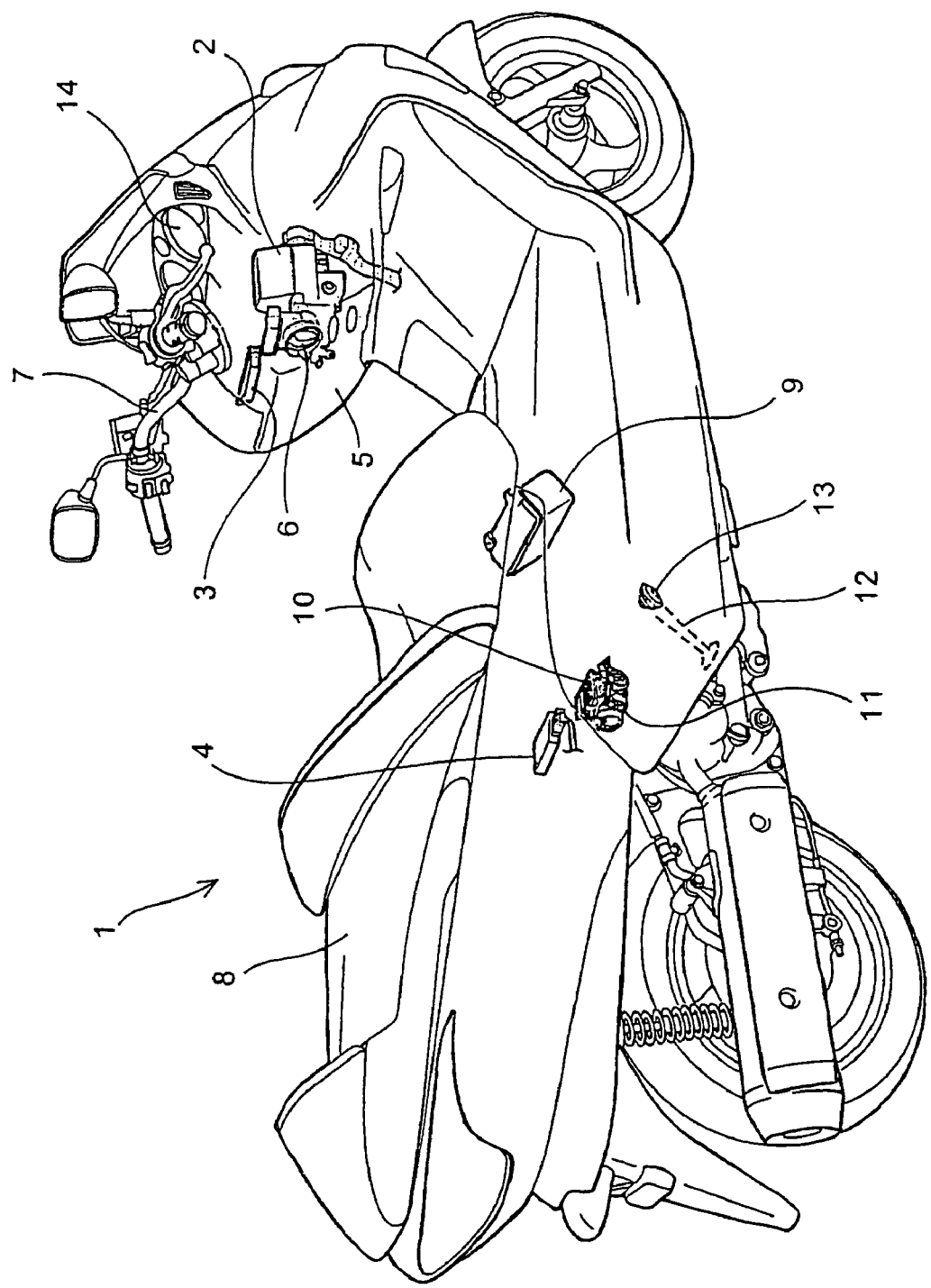
FIG. 2 is a rear perspective view of a scooter-type motorcycle for mounting the theft prevention device of one embodiment of the present invention thereon.

Hereinafter, one embodiment of the present invention is explained in conjunction with drawings. FIG. 2 is a rear perspective view of a scooter-type motorcycle which mounts a theft prevention device of one embodiment of the present invention thereon. In the drawing, the theft prevention device which is mounted on the motorcycle 1 includes a handle lock module 2, a transmitter antenna 3 and a receiver unit 4. The handle lock module 2 is mounted on a main frame not shown in the drawing such that a manipulation knob 6 is exposed to the outside from an inner cover 5. By extending or retracting a lock pin with the rotatable manipulation of the manipulation knob 6, it is possible to fix a head pipe and a stem shaft which supports a handle 7 or to releasable fix the head pipe and the stem shaft. The manipulation knob 6 also functions as a main switch of the motorcycle 1 and a manipulation portion for starting an engine.

The transmitter antenna 3 is housed in a back side of the inner cover 5, while the receiver unit 4 is mounted on a seat rail portion not shown in the drawing which is arranged below a seat 8. A battery 9 which constitutes a power source of the motorcycle 1 is mounted on an approximately center portion of a vehicle body. An engine control unit (ECU) 10, which receives the supply of electricity from the battery 9 and controls an ignition system and a fuel supply system of the motorcycle 1, is mounted on the approximately center portion of a vehicle body. In this embodiment, the ECU 10 and a throttle body 11 are integrally formed.

The manipulation knob 6 is configured such that the rotational manipulation thereof is usually prohibited and the prohibition is released when determination processing of a theft prevention ID code is performed. Thereafter, the ID code agrees with a preset memory code. In the same manner, also with respect to the ECU 10, the starting of an engine control is allowed when the ID code and the memory code agree with each other.

A side stand 12 is mounted on a left side of a vehicle body of the motorcycle 1. The side stand 12 is pivotally supported on a side frame (not shown in the drawing) on the left side of the vehicle body, wherein the side stand 12 is used in a downwardly rotated manner in standing the motorcycle 1 in a leftwardly inclined posture in a non-traveling state. As described later, the side stand 12 is used as an input means for the theft prevention ID code. A side stand switch 13 is mounted on a pivotal support portion of the side stand 12 for detecting whether the side stand 12 is stored on the vehicle body side or is downwardly rotated to assume a use state. The side stand switch 13 outputs an "OFF" signal when the side stand 12 is pulled out to assume the use state and outputs an "ON" signal when the side stand 12 is stored on the vehicle body side.

An instrument panel 14 is provided in front of the handle 7. The instrument panel 14 includes a theft prevention device indicator besides a speedometer, rotational speedometer, residual fuel meter and an engine water temperature meter.

Figure 1:
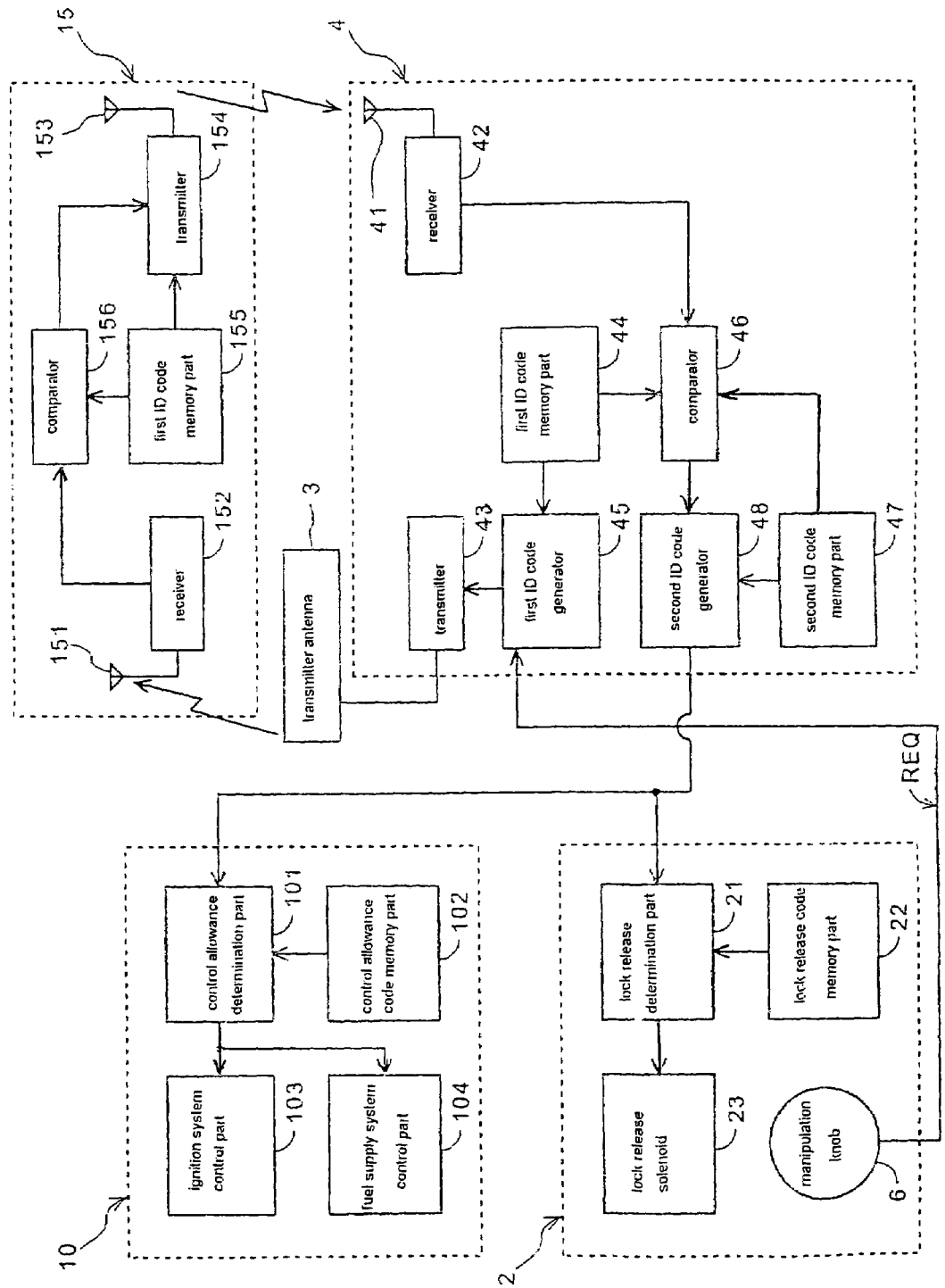
FIG. 1 is a system block diagram view of a theft prevention device according to one embodiment of the present invention.

FIG. 1 is a system block diagram view of the theft prevention device. In FIG. 1, an electronic key 15 includes a receiver 152 which is connected to a receiver antenna 151, a transmitter 154 which has a transmitter antenna 153, a first ID code memory part 155 which prestores a first ID code, and a comparator 156 which compares a code received by the receiver 152 and the first ID code which is stored in the first ID code memory part 155. The electronic key 15 includes a battery not show in the drawing which functions as an operational power source for starting operation thereof upon manipulation of a start switch not shown in the drawing.

The receiver unit 4 includes a receiver 42 which has a receiver antenna 41, a transmitter 43 which is connected to the transmitter antenna 3, a first ID code memory part 44, a first ID code generator 45, and a comparator 46 which compares a code received by the receiver 42 and a first ID code which is stored in the first ID code memory part 44. Further, the receiver unit 4 includes a second ID code memory part 47 and a second ID code generator 48.

The handle lock module 2 includes a lock release determination part 21 for deciding whether the rotation of the manipulation knob 6 is allowed, a lock release code memory part 22 for prestoring a lock release code, and a lock release solenoid 23. The manipulation knob 6 is always capable of performing a push manipulation.

The ECU 10 includes a control allowance determination part 101 for determining whether the start of the control is allowed or not, a control allowance code memory part 102 for storing a control allowance code, an ignition system control part 103, and a fuel supply system control part 104.

In the above-mentioned construction, when the manipulation knob 6 which is mounted on the handle lock module 2 is manipulated by pushing, a request signal REQ is inputted into the first ID code generator 45 of the receiver unit 4. The first ID code generator 45 reads the first ID code from the first ID code memory part 44 in response to the request signal REQ and supplies the first ID code to the transmitter 43. The transmitter 43 transmits the first ID code through the transmitter antenna 3.

The receiver 152 of the electronic key 15 inputs a reception signal to the comparator 156. The comparator 156 compares the inputted reception signal with the first ID code stored in the first ID code memory part 155. When the inputted reception signal is the first ID code transmitted from the receiver unit 4, both signals agree with each other. In response to the result of the agreement, the transmitter 154 transmits the first ID code stored in the first ID code memory part 155 from the transmitter 154 using the transmitter antenna 153.

In the receiver 42 of the receiver unit 4, in the same manner as the electronic key 15, the receiver 42 inputs the reception signal to the comparator 46. The comparator 46 compares the inputted reception signal with the second ID code stored in the second ID code memory part 47. When the inputted reception signal is the first ID code transmitted from the electronic key 15, both signals agree with each other. In response to the result of agreement, the second ID code generator 48 reads the second ID code stored in the second ID code memory part 47 and outputs the second ID code to the control allowance determination part 101 of the ECU 10 and the lock release determination part 21 of the handle lock module 2 respectively.

The control allowance determination part 101 of the ECU 10, when the second ID code is inputted to control allowance determination part 101, compares the second ID code with the control allowance code stored in the control allowance code memory part 102. When both codes agree with each other, the control start allowance is given to the ignition system control part 103 and the fuel supply system control part 104. Due to such an operation, the engine control of the motorcycle 1 can be started.

When the second code is inputted to the lock release determination part 21 of the handle lock module 2, the second ID code is compared with the lock release code stored in the lock release code memory part 22. When both codes agree with each other, the lock release solenoid 23 is driven thus releasing the handle lock and, at the same time, enabling the rotary manipulation of the manipulation knob 6. Due to such a constitution, manipulation of the handle is allowed. Further, in addition to the push manipulation, locking of the rotary manipulation of the manipulation knob 6 is released. Thus, the manipulation knob 6 becomes rotatable.

However, the receiver unit 4 is not compatible with the handle lock module 2 and the ECU 10, the lock release determination part 21 and the control allowance determination part 101 do not bring about a collation "agree" result. Thus, the engine control cannot be started and, at the same time, the handle locking and the locking of the manipulation knob 6 are also not released.

In this embodiment, the second ID code is set to prevent the occurrence of a case that a third party obtains an electronic key and a receiver unit additionally, exchanges the receiver unit 4 with the existing receiver unit 4 of the motorcycle 1 so as to release the handle lock of the motorcycle 1 or to start the engine control by the ECU 10. That is, even when the electronic key 15 and the receiver unit 4 are aligned with each other by exchanging the receiver unit 4, unless the handle lock module 2 and the ECU 10 are not exchanged, the second ID code outputted from the second ID code generator 46 does not agree with the lock release code and the control allowance code with each other. Thus, the engine cannot be started and the handle lock cannot be released.

Figure 3:
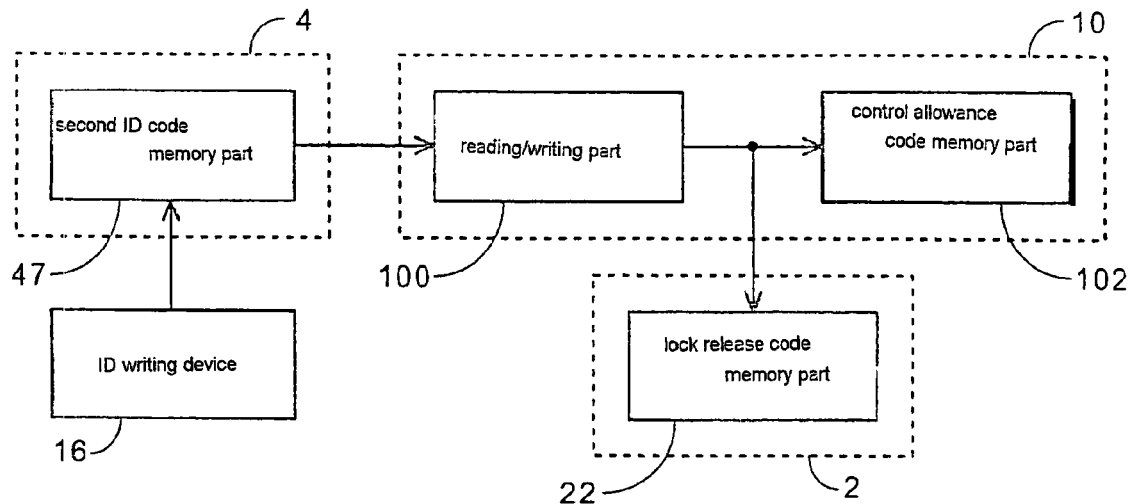
FIG. 3 is a block diagram showing a second ID code registration function, and more particularly, a view showing a function necessary for registration processing at the time of assembling a finished vehicle in a factory.

Subsequently, the manner of registering the second ID code (also applicable to the lock release code and the control allowance code in the same manner) in the motorcycle 1 is explained. FIG. 3 is a block diagram showing a second ID code registration function. More particularly, FIG. 3 is a view showing a function necessary for the registration processing at the time of assembling a finished vehicle in a factory. In FIG. 3, in the second ID code memory part 47 of the receiver unit 4, the second ID code is preliminarily written in the ID writing device 16. The ID writing device 16 is a dedicated device for allowing the writing of data into the second ID code memory part 47 which constitutes a RAM.

As a part which performs a function of a microcomputer in the ECU 10, a reading/writing part 100 is provided. When the receiver unit 4 and the ECU 10 are connected with each other due to this function, the second ID code is read from the second ID code memory part 47 and the second ID code is written in the control allowance code memory part 102 of the ECU 10 and the lock release code memory part 22 of the handle lock module 2.

Here, besides such a constitution, at the time of assembling a finished vehicle in a factory, the ID code may be individually written in the second ID code memory part 47, the control allowance code memory part 105 and the lock release code memory part 22 using the ID writing device 16.

Figure 4:
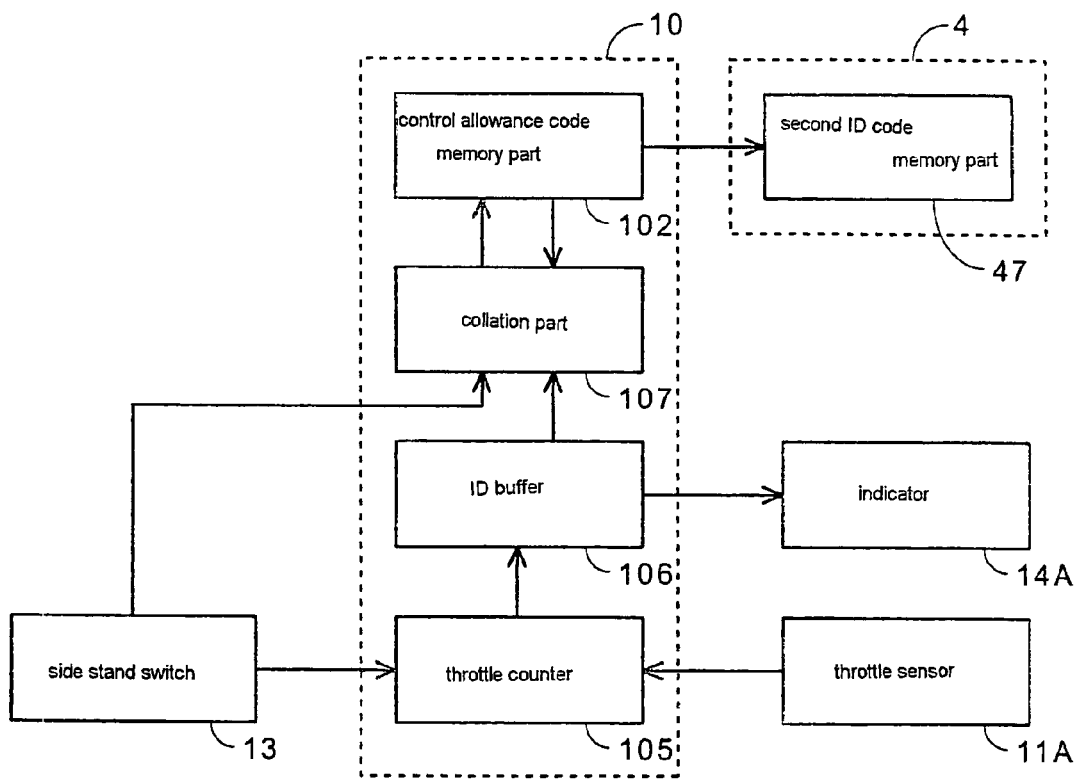
FIG. 4 is a block diagram showing the second ID code registration function when the receiver unit is exchanged.

FIG. 4 is a block diagram showing the second ID code registration function when the receiver unit 4 is exchanged. In FIG. 4, the ECU 10 includes a throttle counter 105, an ID buffer 106 and a collation part 107. The ID buffer 106 can store six counter values corresponding to six-digit second ID code, for example. An indicator 14A is mounted on the instrument panel 14, for example.

The counter values of the throttle counter 105 are incremented when the opening/closing of the throttle (a series of operations in which the throttle is opened to a preset opening angle and is succeedingly fully closed) is detected by the throttle sensor 11A until a preset time (for example, 5 seconds) elapses from a point in time when the standing/storing of the side stand 12 is detected based on an output of the side stand switch 13. When the opening/closing of the throttle is not detected until the preset time elapses, the counter values of the throttle counter 105 are reset.

Then, upon detection of the standing/storing of the side stand 12 after opening/closing of the throttle, the counter values of the throttle counter 105 at this point in time are written in the ID buffer 106. When the side stand 12 is stood or stored after writing the counter values to the ID buffer 106, the detection of the opening/closing of the throttle and the counting by the throttle counter 105 are performed again for inputting the next digit number to the ID buffer 106.

The standing/storing of the side stand 12, the opening/closing of the throttle, the increment of the counter values and the writing of the counter values to the ID buffer 106 are repeated until the predetermined number (6 in this case) of counter values is stored in the ID buffer 106. Then, when predetermined number of counter values is stored in the ID buffer 106 and the side stand 12 is stood or stored in response to a sign by turning on the indicator 14A, the registration is allowed.

When the registration is allowed, a row of counter values stored in the ID buffer 106, that is, the six-digit number is written in the collation part 107 and is collated with the control allowance code which is registered in the control allowance code memory part 102 of the ECU 10. When the collation result shows that the six-digit number agrees with the control allowance code, the indicator 14A is flickered and, at the same time, the control allowance code is read by accessing to the control allowance code memory part 102 and is written in the second ID code memory part 47 of the receiver unit 4.

Figure 5:
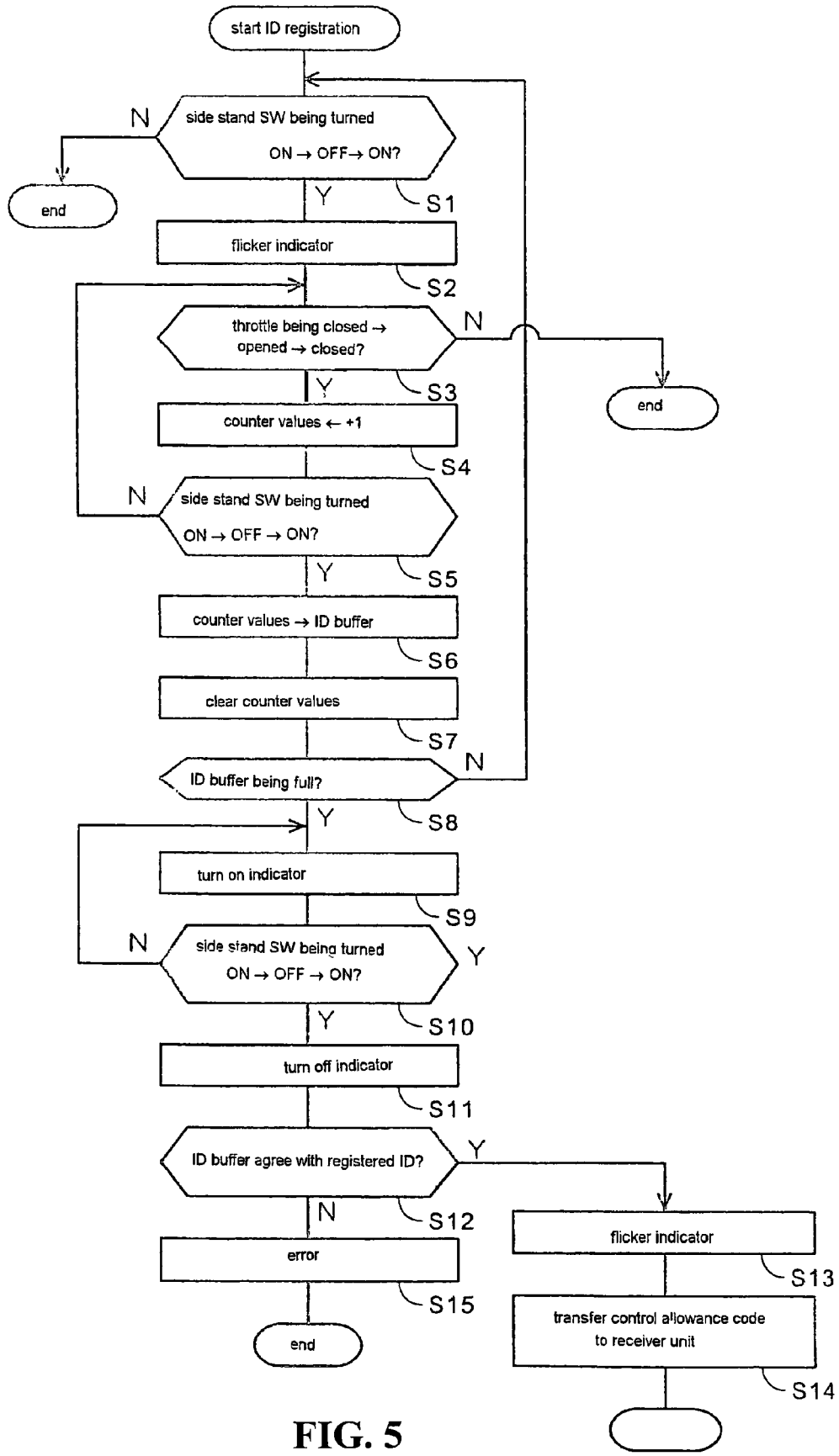
FIG. 5 is a flow chart showing registration processing of the second ID code when the receiver unit is exchanged.

FIG. 5 is a flow chart showing the registration processing of the second ID code when the receiver unit is exchanged. In a pre-stage of the flow chart, a power source is connected to the ECU 10. The power source is a battery for registering the second ID code and is connected to the ECU 10 using an inspection tool (a dedicated harness). For example, a coupler which connects a crank pulser and the ECU 10 is removed and the power source is connected to the ECU 10 through the coupler. Here, for removing noises, it may be preferable that the battery is connected to the ECU 10 temporarily, is separated from the ECU 10 once thereafter, and is connected to the ECU 10 again.

In step S1, it is monitored whether the side stand switch 13 is changed over from an ON state to an OFF state and is again changed over from the OFF state to the ON state or not. If this determination is affirmative, the processing advances to step S2 in which the indicator 14A is flickered. Due to this flickering of the indicator 14A, a user can recognize that the registration mode is in progress.

In step S3, it is determined whether the throttle 11 is operated such that the throttle 11 is once opened and is again closed or not in response to an output of the throttle sensor 11A. If this operation is detected, the value of the throttle counter 105 is incremented in step S4.

In step S5, it is monitored whether the side stand switch 13 is changed over from the ON state to the OFF state and is again changed over from the OFF state to the ON state. Steps S3 to S5 are repeated until this determination becomes affirmative, and when the determination in step S5 becomes affirmative, the processing advances to step S6 and the counter values at this point of time are transferred to the ID buffer 106. The ID buffer 106 includes a region for the number of digits of the second ID code, wherein the inputted counter values are sequentially stored from the lower digit. When the counter values are transferred to the ID buffer 106, the counter values of the throttle counter 105 are cleared in step S7.

In step S8, it is determined whether the ID buffer 106 stores the counter values of the full digit number, that is, the predetermined digit number such as six digits or not. If this determination is affirmative, the processing advances to step S9 and the indicator 14A is turned on to inform a user that the predetermined digit number is inputted. In step S10, the presence or non-presence of a sign which allows a sign of the allowance of the registration from a user is determined by monitoring whether the side stand switch 13 is changed over from an ON state to an OFF state and is changed over from the OFF state to the ON state or not.

When it is determined that the registration allowance sign from the user is inputted in step S10, the processing advances to step S11 and the indicator 14A is extinguished. Then, the processing advances to step S12 in which it is determined whether the counter values which are stored in the ID buffer 106 agree with the registered ID, that is, the control allowance code or not by the collation part 107.

When the control allowance code and the counter values of the ID buffer 106 agree with each other in step S12, the processing advances to step S13 and a display indicative of the completion of registration is performed by the flickering of the indicator 14A. In step S14, the control allowance code is transferred to the receiver unit 4 from the ECU 10. In the receiver unit 4, the transferred control allowance code is registered to the second ID code memory part 47 as the second ID code.

When the determination in step S12 is negative, the processing advances to step S15 and an error display is performed. The error display is, for example, performed by the flickering of the indicator 14A. The flickering of the indicator 14A here differs, for displaying an error, from the flickering at other timings in terms of ON/OFF cycles. In the error display, for example, the indicator 14A is extinguished by finishing the open/close operation of the throttle. Here, the error is not confirmed based on one determination but the determination is performed the predetermined times, for example, five re-entries, and when the values of the throttle counter do not collate with the second ID code even in such a case, the error may be confirmed. Accordingly, when the determination in step S9 is negative, when the number of determination is up to five times, the processing returns to step S1, and when the collation is not successful even with five determinations, the registration processing is not accepted.

Here, in step S1 and step S3, when the change of the ON/OFF state of the side stand switch 13 or the throttle open/close operation is not performed until the preset determination time elapses, the processing of the flow chart is finished.

Figure 6:
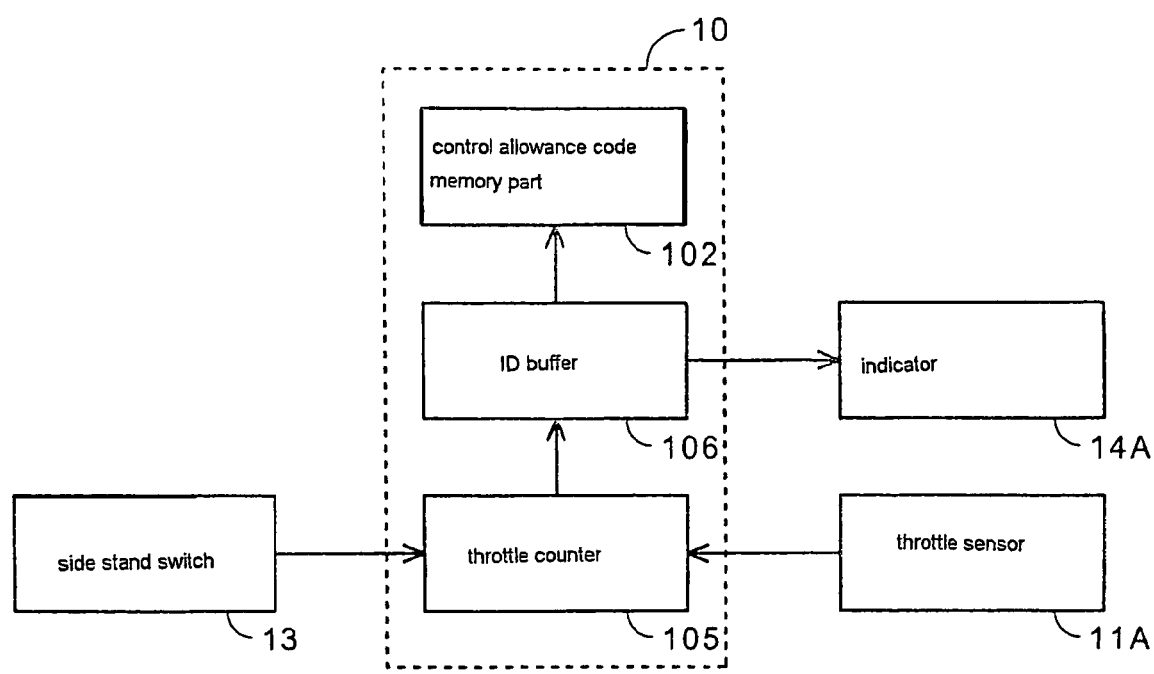
FIG. 6 is a functional block diagram showing the registration function of the second ID code when only an ECU is exchanged with a brand new ECU.

Next, the registration function of the second ID code when only the ECU 10 is exchanged with a brand new ECU is explained in conjunction with a functional block diagram shown in FIG. 6. In FIG. 6, symbols equal to the symbols shown in FIG. 4 indicate identical or similar parts. In the ID buffer 106, the values of the throttle counter are stored by the standing/storing of the side stand and the manipulation of the throttle. When the values of the throttle counter corresponding to the predetermined number, that is, the predetermined digit number are stored in the ID buffer 106, the second ID code of the predetermined digit number is written and registered in the control allowance code memory part 102 from the ID buffer 106.

The processing when only the ECU 10 is exchanged with a brand new ECU is similar to the processing described in the flow chart shown in FIG. 5. However, when the ECU 10 is exchanged with a brand new ECU, the function of the collation part 107 is unnecessary. Thus, in the flow chart shown in FIG. 5, the processing is modified such that step S12 is skipped and the processing advances to step S13 from step S11.

In the above-mentioned embodiment, the registration technique of the second ID code has been explained in conjunction with the example in which the prestored first ID code is transmitted from the receiver unit 4 in response to the push manipulation of the manipulation knob 6. However, the present invention can be modified as follows. That is, the receiver unit 4 may not transmit the fixed first ID code in response to the request signal REQ but may transmit different numerical values, that is, a cipher each time in response to the request signal REQ. A means which deciphers this cipher may be a calculation formula which outputs the first ID code in response to this cipher as an input, for example. A calculation formula equal to the calculation formula in the electronic key 15 is provided to the receiver unit 4, and the first reference code based on the output cipher is preliminarily calculated. Then, the first reference code and the first ID code received from the electronic key 15 are collated with each other and the second ID code is outputted only when the authorized first ID code is received.

Figure 7:
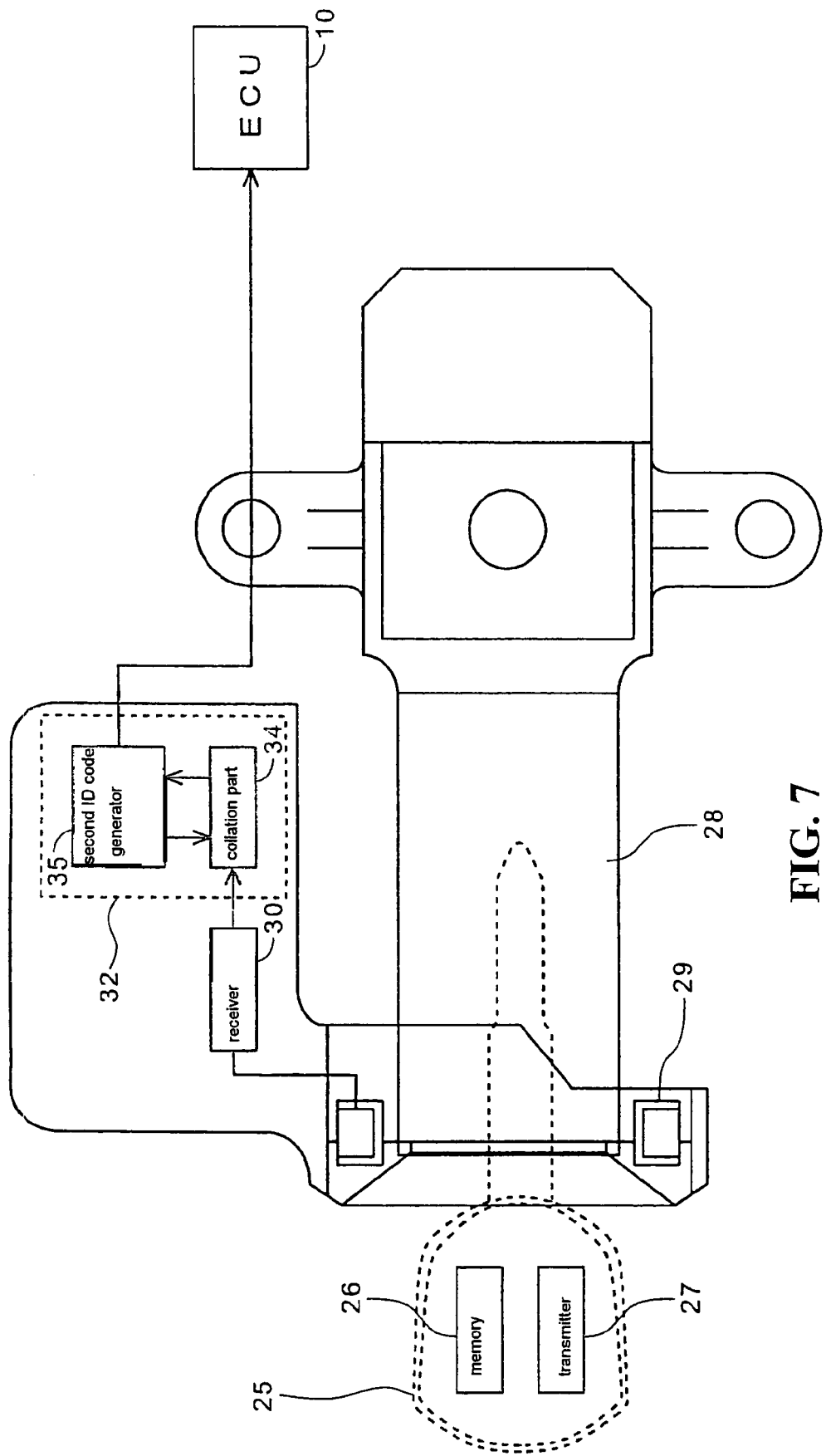
FIG. 7 a constitutional view of an immobilizer system.

The above-mentioned embodiment is directed to the so-called smart key system which enables the control by the ECU 10 and releases the handle lock in a state that a rider carries the electronic key 15 and pushes the manipulation knob 6 when the rider approaches the vehicle. The present invention is also applicable to an immobilizer. FIG. 7 is a view of an immobilizer system. In FIG. 7, in an ignition key 25, a memory 26 in which a first ID code is prestored and a transmitter 27 for transmitting the first ID code are incorporated. The transmitter 27 of the key 25 and the key cylinder 28 are joined by an induction coil 29, for example. When the rider inserts the key 25 into the key cylinder 28 and turns the key 25, electricity is supplied to the transmitter 27 via the induction coil 29. The transmitter 27 responds to the supply of the electricity, reads the authentication code from the memory 26, and transmits the authentication code to the key cylinder 28 side. This authentication code is received by a receiver 30 and the reception is notified to an immobilizer CPU 32.

The immobilizer CPU 32 includes, as functions thereof, a memory part 33 which stores a reference ID code, and a collation part 34 which compares the notified first ID code and the reference ID code. When it is determined that the first ID code and the reference ID code agree with each other, the collation part 34 transmits a second ID code stored in a second ID code memory part 35 to the ECU 10.

The ECU 10, in the same manner as the operation of the smart key system, collates the second ID code inputted from the immobilizer CPU 32 with a control allowance code. When both ID codes agree with each other as a result of collation, the ECU 10 inputs signals which allow the ignition system control part 103 and the fuel supply system control part 104 to perform operations thereof.

In the immobilizer system having such a construction, steps for registering the second ID code when a finished vehicle is assembled, when the key 25 and the key cylinder 28 are exchanged with brand new key and key cylinder, and when the ECU 10 is exchanged with a brand new ECU are substantially equal to the steps adopted in the above-mentioned smart key system.

In the above-mentioned embodiment, the second ID code is notified to a user as an authentication code at the time of selling the vehicle, and when the exchange of the key system or the exchange of the ECU is performed, the second ID code which only the user is authorized to know is re-registered using the above-mentioned registration method. A third party who is not notified of the authentication code cannot succeed in the collation using the second ID code even when the third party exchanges the receiver unit 4 and the ECU 10. Accordingly, it is possible to ensure the prevention of the motorcycle 1 from being moved by exchanging the receiver unit 4 or the ECU 10 with a brand new receiver unit 4 or ECU 10 without using the authorized key.

Here, as means which notifies the user of the second ID code, the second ID code may be described in a card and the card may be handed over or may be mailed. However, the second ID code may be notified to the user using electronic mail.

Although the present invention has been explained heretofore in accordance with the best mode for carrying out the invention, the present invention is not limited to such a best mode and various modifications are conceivable. For example, as means for registering the second ID code, the output signals of respective sensors for detecting standing/storing of the side stand and the opening/closing of the throttle are used. However, in place of input signals obtained by detecting the standing/storing of the side stand and the opening/closing of the throttle, the manipulation or the number of manipulations of other switch mounted on the vehicle, for example, a blinker switch or a brake switch may be detected and a detection result may be used as an instruction for registering the second ID code.

Further, the agreement of the collation of the ID codes includes a case in which a preset relationship is established between both codes which agree with each other or are collated with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle theft prevention device comprising:
   a portable transmitter arranged outside a vehicle for transmitting a first ID code;
   a receiver unit for receiving the first ID code transmitted from the portable transmitter and for outputting a second ID code when the first ID code agrees with a preset first reference code; and
   an engine control unit for starting an engine control when the second ID code is inputted to the engine control unit and the second ID code agrees with a preset second reference code;
   wherein the receiver unit of the vehicle theft prevention device includes a second ID code generator for recording the second reference code to the engine control unit, and an ID writing device for writing the registered second reference code into the receiver unit as the second ID code,
   wherein data which are inputted for registering the second reference code to the engine control unit are inputted in response to an open/close manipulation of a throttle provided to the vehicle and a standing/storing manipulation of a side stand provided to the vehicle.

2. The vehicle theft prevention device according to claim 1, wherein the portable transmitter includes a comparator for deciding the first ID code based on a code inputted from the receiver unit, and
   the receiver unit includes another comparator for deciding the first reference code based on the code outputted by the receiver unit.

3. The vehicle theft prevention device according to claim 2, wherein the second reference code is a value intrinsic to each vehicle.

4. The vehicle theft prevention device according to claim 1, wherein the second reference code is a value intrinsic to each vehicle.

5. The vehicle theft prevention device according to claim 1, further comprising a lock module including a manipulation switch exposed to an operator of the vehicle.

6. The vehicle theft prevention device according to claim 5, wherein when the manipulation switch is manipulated by the operator to a first position, a request signal REQ is inputted into a first ID code generator of the receiver unit,
   whereupon the first ID code generator reads the first ID code from a first ID code memory part in response to the request signal REQ and supplies the first ID code to a transmitter on the vehicle which transmits the first ID code to the portable terminal.

7. A theft prevention device adapted to be used with a vehicle comprising:
   a portable transmitter for transmitting a first ID code;
   a receiver unit for receiving the first ID code transmitted from the portable transmitter and for outputting a second ID code when the first ID code agrees with a preset first reference code; and
   an engine control unit adapted for starting an engine control when the second ID code is inputted and the second ID code agrees with a preset second reference code;
   wherein the receiver unit of the vehicle theft prevention device includes a second ID code generator for recording the second reference code to the engine control unit, and an ID writing device for writing the registered second reference code into the receiver unit as the second ID code, wherein data which are inputted for registering the second reference code to the engine control unit are inputted in response to an open/close manipulation of a throttle provided to the vehicle and a standing/storing manipulation of a side stand provided to the vehicle.

8. The theft prevention device according to claim 7, wherein the portable transmitter includes a comparator for deciding the first ID code based on a code inputted from the receiver unit, and the receiver unit includes another comparator for deciding the first reference code based on the code outputted by the receiver unit.

9. The vehicle theft prevention device according to claim 8, wherein the second reference code is a value intrinsic to each vehicle.

10. The theft prevention device according to claim 7, wherein the second reference code is a value intrinsic to each vehicle.

11. The vehicle theft prevention device according to claim 7, further comprising a lock module including a manipulation switch exposed to an operator of the vehicle.

12. The vehicle theft prevention device according to claim 11, wherein when the manipulation switch is manipulated by the operator to a first position, a request signal REQ is inputted into a first ID code generator of the receiver unit, whereupon the first ID code generator reads the first ID code from a first ID code memory part in response to the request signal REQ and supplies the first ID code to a transmitter on the vehicle which transmits the first ID code to the portable terminal.

* * * * *